United States Patent [19]

Abraham

[11] 4,039,156
[45] Aug. 2, 1977

[54] REEL

[75] Inventor: Raymond A. Abraham, San Diego, Calif.

[73] Assignee: Spin Physics, Inc., San Diego, Calif.

[21] Appl. No.: 610,726

[22] Filed: Sept. 5, 1975

[51] Int. Cl.² .......................................... B65H 75/22
[52] U.S. Cl. .................................... 242/71.8; 242/115
[58] Field of Search ................... 242/71.8, 115, 116, 242/118.6, 118.61, 118.62, 77.3, 77.4, 118.4

[56] References Cited

U.S. PATENT DOCUMENTS

| 402,004 | 4/1889 | Day | 242/118.4 |
| 1,050,371 | 1/1913 | Merkel | 242/118.62 |
| 1,270,614 | 6/1918 | Harmon | 242/71.8 |
| 2,949,994 | 8/1960 | Zimmerman | 242/71.8 X |
| 3,822,841 | 7/1974 | Campbell | 242/115 |
| 3,861,614 | 1/1975 | Horak | 242/71.8 |

FOREIGN PATENT DOCUMENTS

| 510,040 | 4/1952 | Belgium | 242/71.8 |
| 1,302,260 | 7/1962 | France | 242/118.4 |

*Primary Examiner*—Stanley N. Gilreath
*Assistant Examiner*—John M. Jillions
*Attorney, Agent, or Firm*—Robert F. Cody

[57] ABSTRACT

A reel for use with a web material such as a magnetic recording tape, a photographic film, etc, wherein the reel is so designed as to enable the web to be removed from the reel without first unspooling the web from the reel. The reel comprises a first and a second flange assembly, each having a flange member and a core element affixed to the flange member. Means are provided for temporarily attaching the core element of the first flange assembly to the flange member of the second flange assembly, and also for attaching the core element of the second flange assembly to the flange member of the first flange assembly. By detaching the temporary attaching means, the flange assemblies may be separated, thereby allowing a web wrapped on the reel to be removed without unspooling. The flange assemblies may be reassembled for repeated use.

1 Claim, 3 Drawing Figures

REEL

BACKGROUND OF THE INVENTION

1. Field of the Invention

This invention relates to a salvageable reel, and more particularly to a reel which allows a web material wrapped thereon to be removed without first unspooling the web from the reel. The reel is suitable for reuse.

2. Description Relative to the Prior Art

When disposing of a web material such as a photographic film, a magnetic recording tape, or a paper tape, it generally happens that the web material is wrapped on a reel. Often the web material on the loaded reel is simply removed by hand-letting the web material fall into a trash container as it is unwound. Alternatively, the web material may be rewound onto another reel or core which is made of plastic or carboard and is of the disposable type. In either case, the process of disposing of a web material is generally time consuming if done by hand; and if done automatically, special spooling apparatus is generally required. Disposable reels or cores have the further disadvantage that both raw materials and manufacturing effort are thrown away.

SUMMARY OF THE INVENTION

When disposing of a web material wrapped on a reel, the present invention makes it unnecessary to first unwind the web from the reel; rather, the invention proposes a reel which permits the web to be removed in bulk form. The reel is not damaged and is reusable.

The invention provides a reel comprising two flange assemblies, each having a flange member and a core element affixed to the flange member. Means are provided for temporarily attaching each core element to the opposite core flange member, thereby forming the composite reel. After use, when a web material wrapped on the reel is to be discarded, the temporary attaching means is removed, thus allowing the two flange assemblies to separate and the web to be directly removed from the reel and discarded. In accordance with the present invention, for some applications it will be preferable to have the core elements of the reel so shaped as to form a space therebetween, thereby permitting the flange assemblies to separate easily even when a web is tightly wound on the reel.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Figure 1:
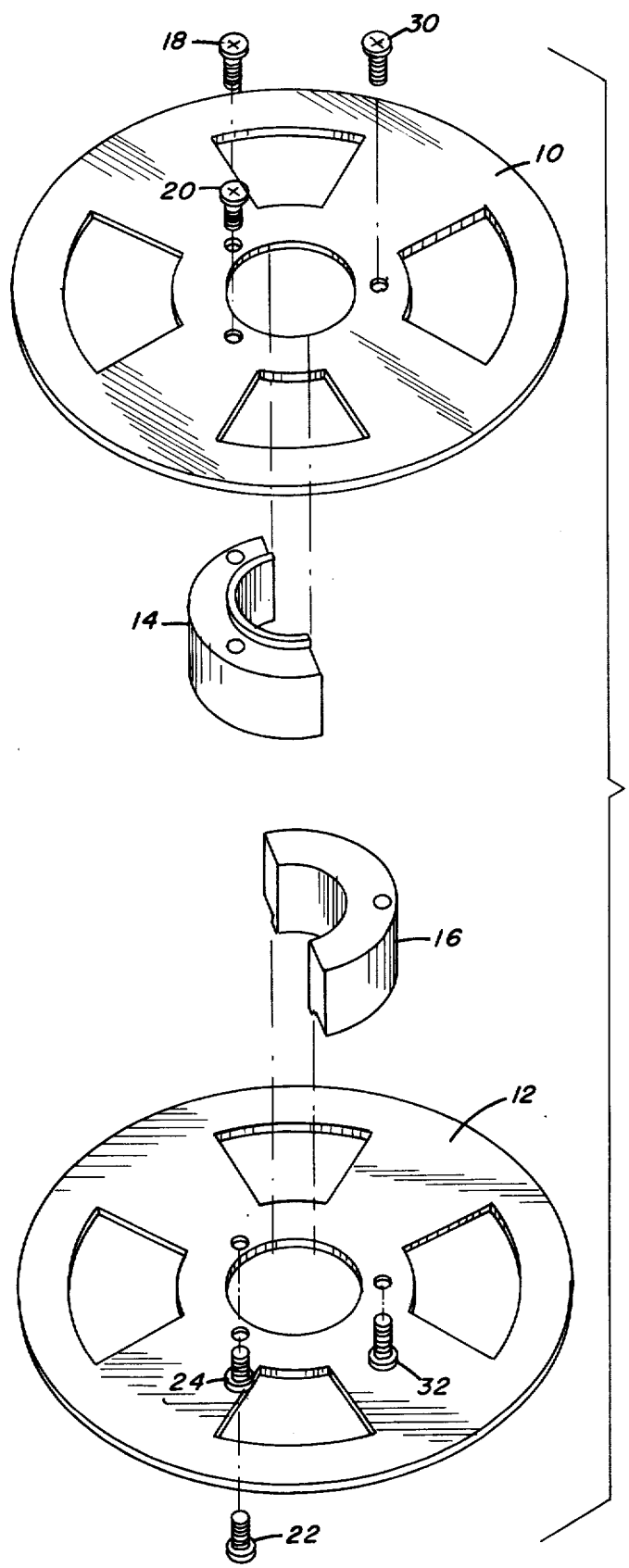
FIG. 1 shows an exploded view of a reel in accordance with the present invention.
Figure 2:
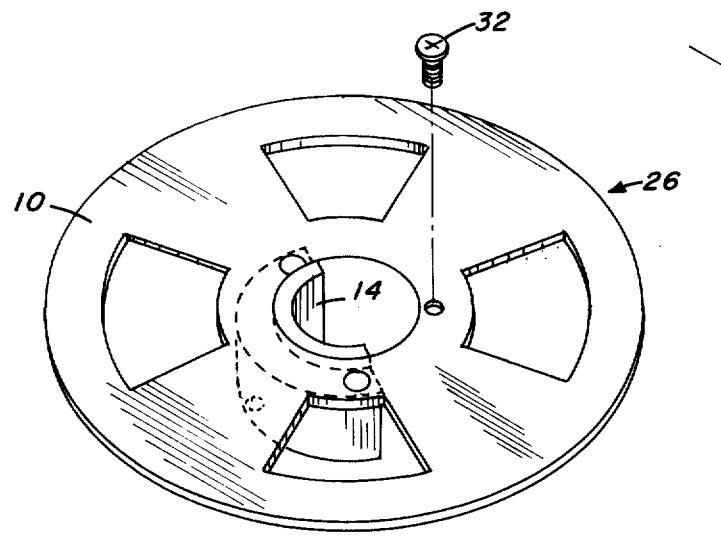
FIG. 2 shows the reel of FIG. 1 partially assembled.
Figure 2:
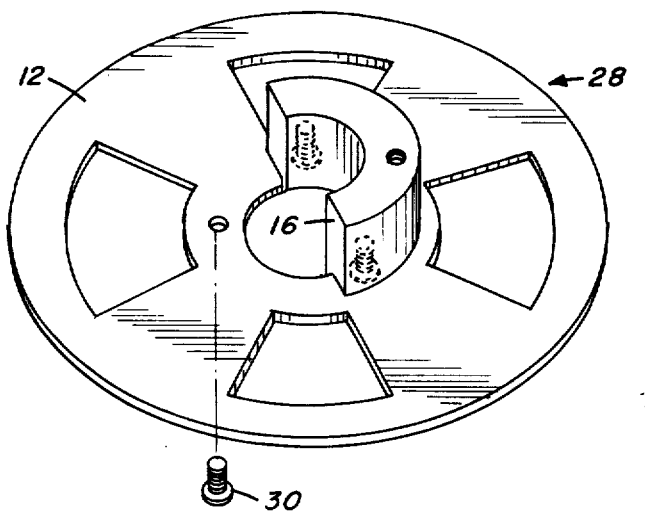

Referring to FIG. 1, a disassembled reel is shown which is a presently preferred embodiment of the invention. The reel comprises a pair of flange members 10 and 12, and a pair of core elements 14 and 16. A pair of screws 18 and 20 affix the core element 14 to the flange member 10, and a pair of screws 22 and 24 affix the core element 16 to the flange member 12, thereby forming two flange assemblies 26 and 28, shown in FIG. 2.

In order to temporarily attach the two flange assemblies 26 and 28, screws 30 and 32 are provided for attaching the flange members 10 and 12 to the core elements 14 and 16. In this particular embodiment, the screws 30 and 32 represent the aforementioned temporary attaching means.

Figure 3:
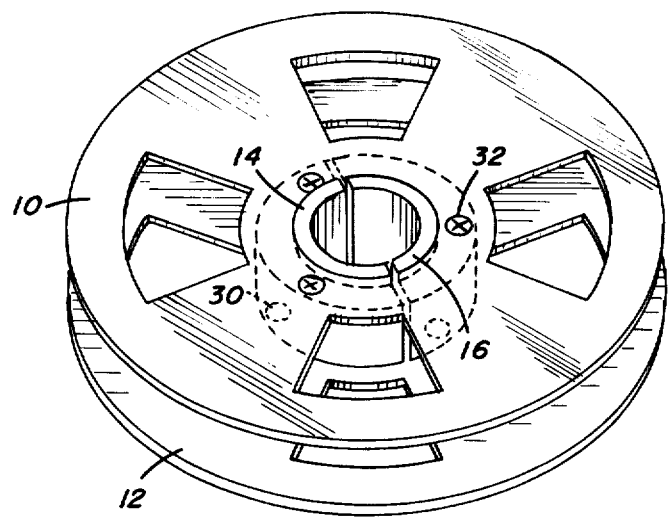
FIG. 3 shows the reel of FIG. 1 completely assembled.

A completely assembled reel in accordance with the present invention is shown in FIG. 3. To remove a web material that is wrapped on the reel, the screws 30 and 32 are removed, thereby allowing the two flange assemblies 26 and 28 to separate. As shown in FIG. 3, a space is provided between the core elements 14 and 16 which allows the flange assemblies 26 and 28 to be separated easily even if the web is tightly wrapped around the core elements 14 and 16.

The invention has been described in detail with particular reference to preferred embodiments thereof, but it will be understood that variations and modifications can be effected within the spirit and scope of the invention. For example, it is within the scope of the invention to replace the screws 30 and 32 with nuts and bolts, or any other suitable temporary attaching means.

I claim:

1. A reel comprising:

first and second flange assemblies, each of which flange assemblies comprise a flange member and a core element rigidly and immovably affixed thereto;

first means for detachably attaching said core element of said second flange assembly to said flange member of said first flange assembly;

second means for detachably attaching said core element of said first flange assembly to said flange member of said second flange assembly; and said first and second attaching means attach said core elements to said flange assemblies such that said core elements form a space therebetween extending along the entire length of said core elements, whereby when a web is wrapped around said core elements of said reel and said first and second attaching means are detached, said first and second flange assemblies collapse radially prior to axial movement whereupon said flange assemblies may be separated.